United States Patent [19]

Matsukata

[11] Patent Number: 4,512,258
[45] Date of Patent: Apr. 23, 1985

[54] HIGH SPEED UNDERGROUND TRANSPORTATION SYSTEM

[76] Inventor: Kosuke Matsukata, 23-18 Toyooka-cho, Tsurumi-ku, Yokohama-shi, Kanagawa-ken 230, Japan

[21] Appl. No.: 460,246
[22] PCT Filed: Aug. 30, 1982
[86] PCT No.: PCT/JP82/00347
 § 371 Date: Jan. 7, 1983
 § 102(e) Date: Jan. 7, 1983
[87] PCT Pub. No.: WO84/00932
 PCT Pub. Date: Mar. 15, 1984
[51] Int. Cl.$^3$ .................. B61B 13/10; B61F 9/00; B64C 9/32
[52] U.S. Cl. .................. 104/138 R; 104/247; 244/52; 244/113
[58] Field of Search .................. 104/138 R, 247; 105/365; 180/903; 244/52, 110 B, 113; 296/1 S

[56] References Cited

U.S. PATENT DOCUMENTS

| | | | |
|---|---|---|---|
| 3,006,288 | 10/1961 | Brown | 104/138 R |
| 3,100,454 | 8/1963 | Dennis | 104/138 R |
| 3,508,497 | 4/1970 | Matsukata | 104/138 R |
| 3,734,428 | 5/1973 | Alexandrov et al. | 104/138 R X |
| 4,000,701 | 1/1977 | Ostgaard et al. | 104/138 R |
| 4,066,021 | 1/1978 | Helm | 104/138 R |
| 4,113,302 | 9/1978 | Ueno | 104/138 R |
| 4,204,478 | 5/1980 | Schmitz | 104/247 |
| 4,261,265 | 4/1981 | Bertelsbeck | 104/247 |
| 4,299,172 | 11/1981 | Dawson | 104/247 |

Primary Examiner—Robert B. Reeves
Assistant Examiner—David F. Hubbuch
Attorney, Agent, or Firm—Henderson & Sturm

[57] ABSTRACT

One of several inventions claimed is a method of providing increased traction to the driving wheels of a high speed transportation vehicle. The vehicle is placed within a tubular passageway, equipped with wheels arranged to contact the tube at three or more equidistant contact points, and these wheels are pressed against the inside surface of the tube by means of controlled application of powerful hydraulic pressure. Vertical stability of the vehicle is achieved by a new apparatus comprised of a spoke attached to the vehicle which projects outward to a point adjacent to but not touching the tube, a set of wheels transversely mounted on each side of the spoke, and a pair of L-shaped guide rails between which the wheels roll. An improved wind resisting braking system is claimed which uses extendable baffle plates and air ports from which compressed air is ejected in a direction opposed to the direction of travel.

1 Claim, 13 Drawing Figures

HIGH SPEED UNDERGROUND TRANSPORTATION SYSTEM

TECHNICAL FIELD

The inventions herein involve the developing field of high speed transportation within a tubular transit system. To obtain the tractive force necessary for high speed, it is essential to increase the product of the coefficient of friction between ground surface and the tractive wheel, and the load carried by the wheel. In the area of engineering, the coefficients of friction of various tire compounds and simple increases in the load upon the tractive wheels have been ineffective in meeting increased demands for traction. Added weight sacrifices cargo capacity. An increase of the effective load on the wheels by other means than simple addition of weight was needed. To meet this need, a method of providing increased downward force on the driving wheels was invented. The method described herein consists of placing the wheel driven vehicle within a tubular passage, equipping it with a set of axially mounted wheels and applying hydraulic pressure to press all of the wheels outwardly with equal force against the inside surface of the tube. In this manner, speed of 500 km/h can be achieved within the tube. Safety is enhanced by way of an improved braking system, of the baffle plate type. High speed curves may be negotiated by use of the inventor's newly invented vertical stabilization system.

BACKGROUND ART

American success in the return of the space shuttle "Columbia" from outer space in April 1981 and later three successful attempts confirming its practicability have affected various worldly activities. Until her rival succeeds in producing a man-carrying shuttle, she will continue to hold an unrivalled position in the space. However, on the global scale, the Soviet Union has accumulated more ICBM's than U.S.A. According to the publication of the Department of Defense of U.S.A., the following figures are given for 1981.

U.S.A.: 1,052
U.S.S.R.: 1,398

It is now realized that in order to narrow the gap of these figures, much effort is being required on the part of the former. As ground superiority is held by the latter, it is now of utmost importance for the United States to have an underground advantage over the U.S.S.R. A high speed underground transportation system will be able to cope with this situation. When the overland traffic system is damaged by ICBM attack, an underground back-up system could be deployed so that the economic activities of the country could be maintained. For this purpose, at least a speed of 500 km/h is desirable. Such speeds are possible with the systems and methods described below.

DISCLOSURE OF THE INVENTION

A high speed underground transport system was suggested more than ten years ago by the present inventor and has been patented in Japan (eight patents including No. 686,545), U.S. Pat. No. 3,508,497, England (No. 1,207,563), France (No. 1,479,115), West Germany (No. 1,755,922) and U.S.S.R. (No. 2,880,358). Since then, new technical advances have been made in various fields with the result that this project can be more easily realized. New advances have been made in tunnel construction. Shield construction now includes a ribbon screw system utilizing a micro computer and a mud pressure shield system, resulting in a high degree of safety and speed. There are advanced techniques in computer designs which assist in the efficient operation of oil-pressure mechanisms. In New York, a water tunnel brings water a distance of 160 km from the Catskill Mountains which will be completed in 1990. A 370 km tunnel project from Chzechoslovakia of Eastern Europe, extending under Austria to the Adrian Coast of South Yugoslavia, has already been approved by the three governments concerned. In view of the new technology available, the invention registered more than ten years ago now requires some changes.

The inventions described herein are designed to overcome a number of problems previously associated with high speed wheel driven vehicles. In conventional high speed transportation by rail, the maximum speed attainable was thought to be between 300 km/h and 380 km/h. An important limitation on the speeds obtainable is the tractive force between the wheels of a vehicle and the road surface. The relationship determining the upper limit is the product of: the coefficient of friction between the road surface and the tire, times the downward force upon the tire. According to the Brigestone Laboratories, the coefficient of friction decreases by less than ten percent (10%) under increase of load at speed of 500 km/h. In view of the fact that the coefficient of friction can not readily be increased, given current rubber compositions, the load on the wheel must be increased. When the load on the wheels in increased, tractive force is improved. By increasing downward force, 500 km/h can be achieved in high speed transportation systems. At this speed, an underground high speed transportation system can effectively compete with present air transporting systems.

The method of providing necessary tractive force for this system can be described as follows. In a circular tunnel, tractive driving wheels at the end of extendable spokes radiating from the vehicle with an equal number of degrees between them are forced outward against the inner surface of the tube. A body frame supported by these driving wheels is provided with the necessary power for the desired speed. In general, two driving wheels and one idle wheel with 120° between them is the preferred mode. However, when more traction is needed, a set of four driving wheels and one idle wheel could be added.

In his previous invention, to stabilize the triangular frame unit and prevent the vehicle from rolling, air jet streams were directed against specifically made baffles on the wall surface of the underground tube to produce stabilizing action. Instead of that system, in the present invention, a pair of L-shaped guide rails are provided with sufficient space between them to allow a center stabilizing spoke fixed to the center bearing case and triangular frame to travel between them. The stabilizing spoke is provided with guide wheels which are attached to the spoke by means of a hydraulically extendable perpendicular support, allowing the wheels to contact the rails. To negotiate curves, the gap between these L-shaped rails is made wider at the places where needed. This change leaves the upper tube free for the movement of the baffle braking plates, discussed infra, which can be extended from the body of the vehicle. To increase the working effect of these baffle plates, air jets are provided to direct air against the direction of travel so that accumulated energy is further dissipated.

In high speed vehicles, an effective braking system is essential. Besides disk brakes, improved flat baffle plates have been invented which protrude from the body surface on both sides at two places, augmented by streams of air exhausted from the baffle plates. A simple type of baffle plate brake has been registered as Patent No. 744,871 in Japan. In the Linear Motor Car of Japanese National Railways project, three hundred billion (300,000,000,000) yen have been invested. Yet due to difficulties in the braking system, an experiment with men on board has not been performed. Development of West Germany's magnetic floating system has been stopped though five hundred billion (500,000,000,000) yen were spent for the project. The basic reason for these failures can be attributed to the difficulty encountered in dissipating the energy accumulated in flight to allow for deceleration. In a Vetol (vertical take off and landing) aircraft, vector thrust is well utilized in dealing with this energy problem.

In the cooling system of this underground railway, no hot air is allowed to be ejected outside the cars, so that tire temperatures are controlled. In this system, a cool air supply car is provided. Cubed ice blocks of 3 centimeters per side are made at ice block depots located at various strategic points in the underground tube. The small volume of the ice block facilitates their production by small automatic refrigerators. As a by-product, passengers can enjoy cooled air on their underground journey. At high speed where tires are apt to be highly heated, cooling of the tires is effected by the inventor's Japanese Patent No. 1,006,297.

Tractor motors, which are installed in the unit frame, can be collectively positioned at the fore and aft end cars of the train so that noise and vibration can be effectively isolated from the passenger cars.

Figure 1:
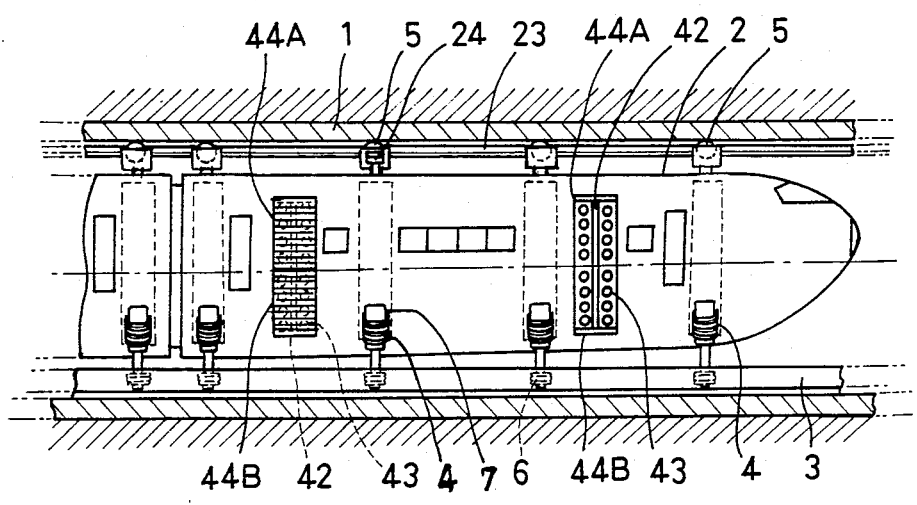
FIG. 1 shows cut-out side view of the interior of an improved high speed underground railway cars in an underground tube.
Figure 9:
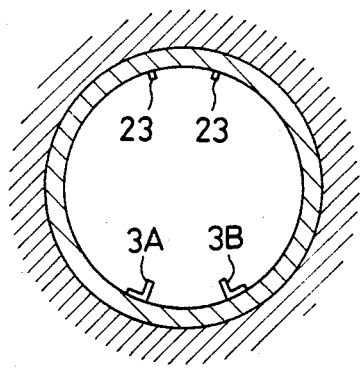
FIG. 9 shows a section of underground tube showing electric overhead lines and bottom guide rails.
Figure 10:
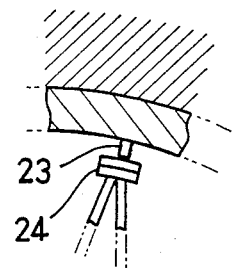
FIG. 10 shows detail of electric overhead line.

| List of Numerals for Drawings | | | |
|---|---|---|---|
| 1 | Tube | 2 | Car |
| 3A, 3B | Guide Rail | 4, 4A, 4B, 4C, 4D | Traction Wheels |
| 5 | Idle Wheel | 6A, 6B | Stabilizing Wheel |
| 7 | Electric Motor | 8 | Center Axle |
| 9, 9A, 9B, 9C, 9D | Radiating spoke | 10 | Earth |
| 11 | Elastic Construction under Hydraulic Pressure | 12 | Pipe Line |
| 13 | Passage Corridor | 16 | Oil Pressure Control Reservoir |
| 17 | Oil Box | 18 | Oil Pipe Line |
| 19 | Perpendicular member | 20 | Stabilizer wheel frame |
| 21 | Frame axle | 22 | Oil Pressure Control Room |
| 23 | Overhead electric feed line | 24 | Electric Current Receiving Unit |
| 28 | Cool Air Supply Car | 29 | Ceiling door |
| 30 | Cool Chamber | 31 | Lower Door |
| 32 | Motor | 33 | Door |
| 34 | Window | 35 | Ice Cake |
| 36 | Cooling Pipe | 37 | Fan |
| 38 | Wind Circulator | 39 | Triangle Frame |
| 40 | Stabilizing Spoke | 41 | Sprocket Shutter Chain |
| 41A, 41B | Brake Shutter | 42 | Brake Baffle Plate |
| 42A, 42B | Baffle Plate Pressure Ram | | |
| 43 | Air Jet Hole | 43A | Air Jet Pump |
| 44A, 44B | Shutter | | |

BEST MODES FOR CARRYING OUT THE INVENTION

Reference is made to FIGS. 1, 2, 9, 10 and 11. A concrete tubular wall (1) forming a true circle is surrounded by earth (10). At the lowest part in the center of the concrete wall is a pair of L-shaped angles (3A), (3B) extending longitudinally along the tube with some distance circumferentially between them. Near the highest position of the wall, a pair of overhead electric feed lines (23) are firmly fixed. In order to hold car (2) in the center of tube, the center axle (8) in the center of triangle frame (3) is made to coincide with the center of the vehicle. Radiating spokes (9B), (9C) and (9A) are fitted with hydraulic cylinders to which traction wheels (4B), (4C), and idle wheel (5) are attached. The wheels are made to contact the internal surface of the tube (1) under hydraulic pressure. Constant, equal oil pressure is maintained to the hydraulic cylinders which support the wheels, and is applied at points equidistant from center axle (8). All wheel cylinders are interconnected to form a single hydraulic system with equal pressure throughout. This pressure is under the control of an oil box (17).

The oil box (17) consists of an adjustable means for sensing increases or decreases in hydraulic pressure, and a means of compensating for pressure that is higher or lower than needed. A hydraulic pump would supply additional pressure on demand by forcing more hydraulic fluid into the system. A pressure release valve and a storage reservoir would be used to drain off hydraulic fluid to reduce the pressure in the system. The hydraulic control system is standard in the industry.

The tractive force of each wheel is proportional to product of pressure borne by the tire and the coefficient of friction between tire surface and the tube wall surface. So long as the tire can stand, required tractive force works in a direction parallel to the line of center axle. In the past, on the rail of a conventional railway, if the pressure on the rail was to be increased, there was no other choice other than to increase the weight on the rail. If such an increase is effected by an increase of weight, the amount of cargo carrying capacity had to be sacrificed proportionally. This phenomena limited the speed of the train to about 380 km/h. Speeds of 500 km/h are now obtainable using the method of placing the high speed vehicle within a tube, equipping it with three sets of equally spaced wheels and applying hydraulic pressure to push the wheels outward.

Figure 11:
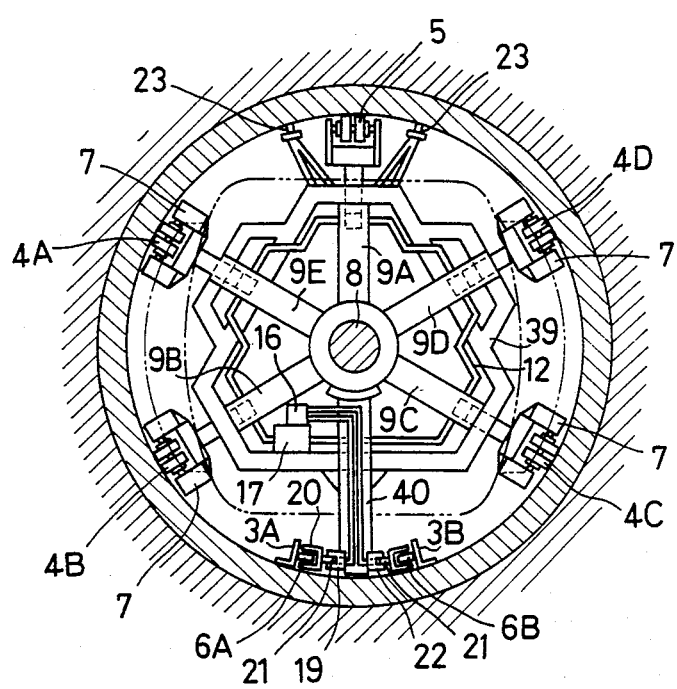
FIG. 11 shows sectional view of underground tube having four units of traction wheel and one unit of the idle wheel.

In this invention, triangular frames are provided in the body of the car construction. Additional traction may be obtained by altering the frame and wheel arrangement. Comparing FIG. 2 and FIG. 11, it is noted that in the former, traction wheels are numbered two sets and in the latter there are four sets. Heavier vehicular loads may require increased traction and load support. If the construction described in FIG. 1 is not enough for the purpose, that of FIG. 11 may be adopted. Reference is made to FIGS. 2, 3, 4, 5 and 11. While in FIGS. 2, 3, 4 and 5, idle wheel (5) and traction wheels (4B) and (4E) are formed. In FIG. 11, new traction wheels (4A) and (4D) are added, thus the total traction force may be further increased.

In inventor's prior design, means are provided to stabilize the triangular frame unit by providing a transversely extended construction from which jet stream of compressed air is made to rush against the specifically made baffles on the wall surface on both side. In the present invention, the addition of extendable baffle plates for braking makes it necessary to discard the old system of stabilization as the prior construction whould present an obstacle to the working of the improved baffle plate brake system. The new stabilization system is as follows: Under the center axle (8), a new vertical spoke (40) is provided which is rigidly fixed to bearing case of central axle and horizontal member of triangular frame (39). At the bottom of the stabilizing spoke (40) on both sides of this spoke (40), perpendicular members (19) thereof, have wheels (6A), (6B) at the end of the hydraulically extendable member (19), and firm contact of the stabilizing spoke's wheels with the guide rails is thereby achieved. When the tube makes a curve deviated from straight line, the distance between L-shaped guard rails is made so wide so that any type of curve can be negotiated.

In the following patents, type of car having two traction wheels and one idle wheel with 120° apart therebetween, is adopted.

Japan No. 686,545

U.S. Pat. No. 3,508,497
France No. 1,579,115
West Germany No. 1,755,922
U.S.S.R. No. 2,880,358
United Kingdom No. 1,207,563

Disclosed in FIG. 11 is an alternative mode providing greater traction. It has four sets of driven wheels and one idle wheel together with a stabilizing spoke (40), and 60° between radiating spokes and one stabilizing spoke therebetween.

Figure 3:
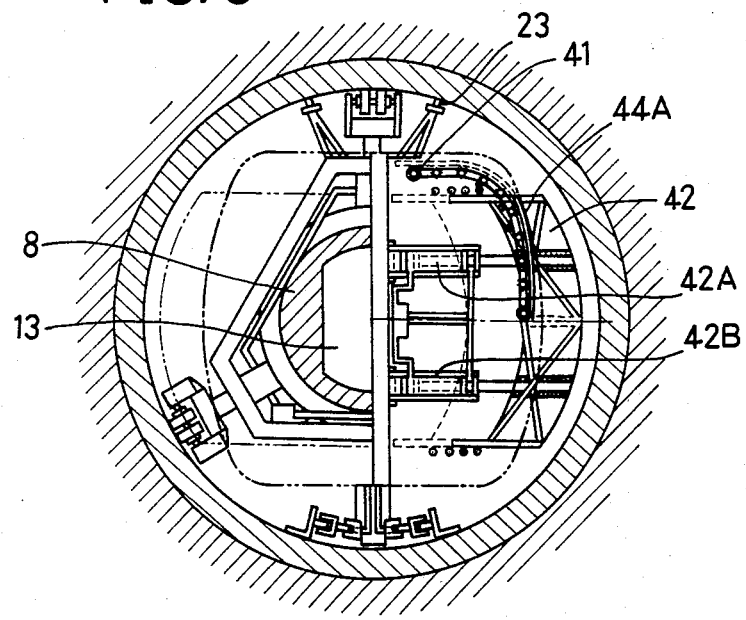
FIG. 3 shows the same sections as FIG. 2 with central passage corridor and right side of baffle brakes in action.
Figure 4:
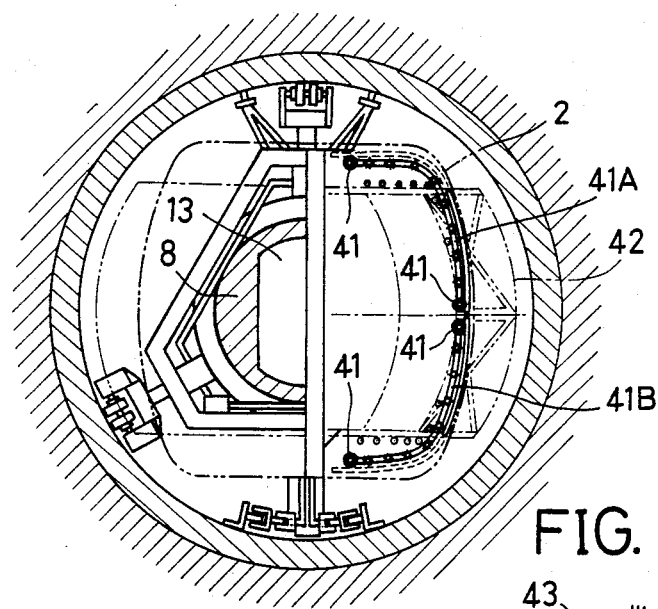
FIG. 4 shows section of the tube with baffle brake which is stored in the body and enclosed by shutters.
Figure 6:
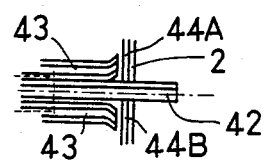
FIGS. 6, 6A, 6B shows details of relationship between baffle plate and outlet of jet air stream.
Figure 5:
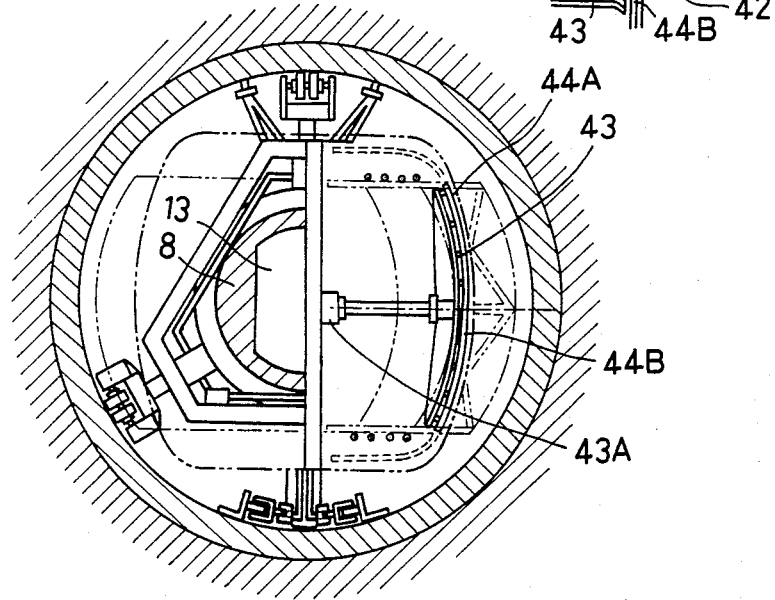
FIG. 5 shows detailed construction of the jet air stream with exhaust outlet.
Figure 6A:
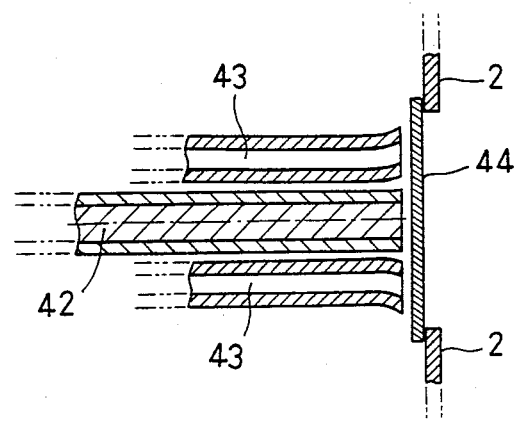
Figure 6B:
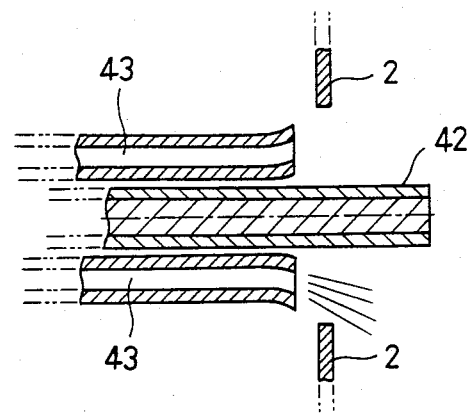
Figure 7:
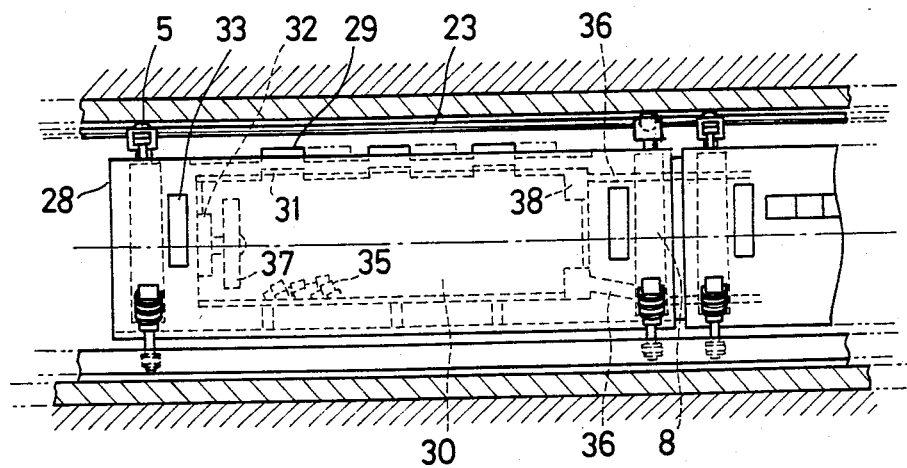
FIG. 7 shows sectional side view of a cool air supply car.

In high speed transportation, an important component is the braking system. In the case of a linear motor car, high speed can be achieved. When the tubular passage has the air evacuated, the speed can be further increased. Energy accumulated must be dissipated to provide deceleration, and can be dealt with by using either counter jet thrust or provision of a baffle plate inserted in water. Reference is made to FIGS. 1, 3, 4 and 5. All traction wheels (4A), (4B), (4C), (4D) and (5) are fitted with disk brakes. Besides these brakes, baffle plate brakes are provided to each car. In FIG. 4, shutters (41A) and (41B) are opened along the body surface, which are connected to the sprocket chain rotated by sprocket wheel. In FIG. 3, baffle plate (42) is motivated by oil cylinders (42A) and (42B) and can be made to be exposed outside the body (2). In addition to it, counter-jet thrust is created by high pressure air prepared inside the car (2), and exhausted at ports located at the base of the baffle plates. In this way, collaboration between the baffle plates and high pressure air thrust outlets is used for increased stopping power. FIGS. 6, 6A and 6B show the alternate paths by which air is exhausted to provide for deceleration in either forward or backward directions of travel. In FIG. 1, baffle plates are located on both sides of the body (2) and are somewhat staggered in their relationship to each other. The effect of yawing can easily be controlled by air jets used. When the tubular passage is evacuated, the tube may be coated with resin on its interior surface. In an evacuated tube, braking by baffle plates can not be as efficient as in an air filled tube, so longer stopping distances may be required.

In this invention, an independent cool air supply car (28) is available when necessary. Small ice blocks (35), measuring 3 centimeters cube, are always in stock. Motor fan (37) melting these ice blocks is provided in the cool air supply car (28). At a local depot, a new cool air supply is ready for a fresh start. No large refrigeration system is necessary; small sized systems now available will suffice.

On the traction wheels, tires are used. Cooling these tires can be effected by streams of cooling air from the cool air supply car if necessary, for example see Japanese Pat. No. 1,006,297 to Matsukata.

Figure 2:
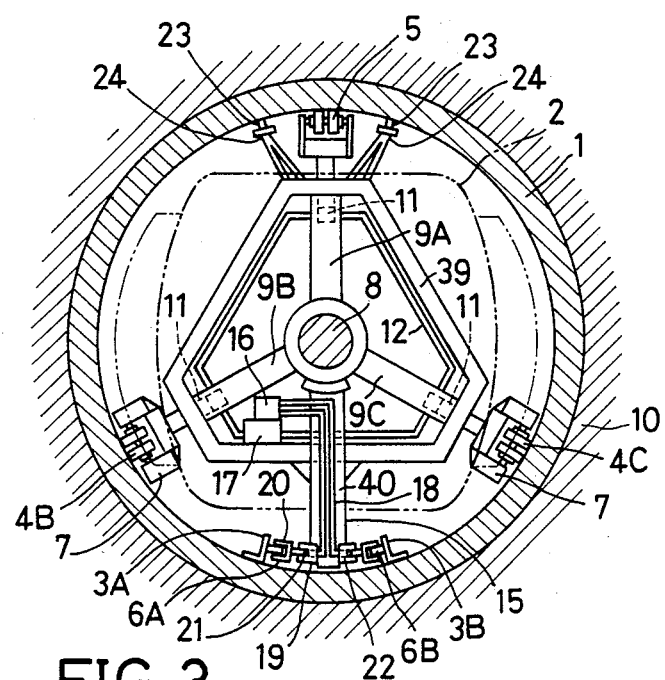
FIG. 2 shows a section of the improved basic construction.
Figure 8:
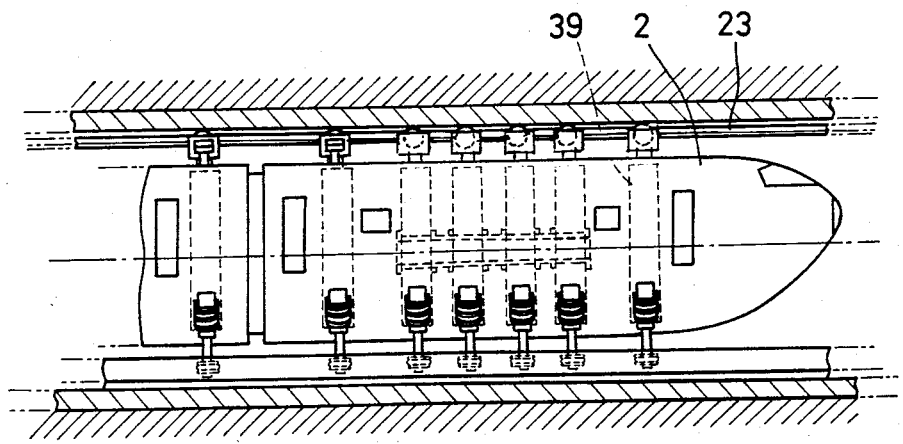
FIG. 8 shows sectional side view of the basic and another type of traction in tandem for front and back driving cars.

In order to provide tractive force, traction wheels can be grouped at the fore or aft cars as shown in FIG. 8. FIGS. 2 and 3 are the same except for the passage corridor which is provided in the center of axle construction (8).

INDUSTRIAL APPLICABILITY

The method described for increasing the traction of wheel driven vehicles and the devices used are readily adaptable to industrial uses. A tubular passageway or tunnel is the basic component. The tunnel is made in the shape of a circular tube, and from its center, at equal radians of 30° or 120° therebetween, a plurality of spokes is extended toward the inner surface of tube from the center of the vehicle to press against the surface of tube wall at higher pressure than obtainable by relying on the weight of the vehicle alone. As the result of such increased pressure, an increased tractive force is possible. If this principle is applied to a high speed tube train, the 380 km/h considered maximum for a conventional train, can be increased to 500 km/h. The most important safety concern in a high speed traction train is braking efficiency. Without it there is no possibility of industrial applicability. In this invention, besides disc brakes on the wheels, improved flat baffle plate air resistant brakes on both sides of the car are extendable to the exterior surface of the car for added stopping power, thereby making the increased speeds available due to greater traction safe for public travel.

In the case of a floating type of linear motor car, as it becomes airborne after it is made to increase speed, the energy gained by the airborne body cannot easily be negotiated by electrical magnetic brakes unless some either hydraulic or opposing air thrust brake is made to operate. Besides, if there is stoppage of the electric power supply in working mechanism, the train is liable to encounter catastrophe. Thus, the improved baffle brake with its high pressure air exhausting system has applications in a variety of high speed train systems.

I claim:

1. In an underground high speed transportation system of the type comprising an underground tube, at least one car running in said underground tube, at least two sets of legs of said car, each set having three legs positioned symmetrically around and radiating from an axis coaxial with the axis of the tube, a frame unit connecting said legs, a driving wheel on the extreme end of each of two said legs and a freely rotatable wheel on the extreme end of the third said leg, said two driving wheels lying on an imaginary horizontal line spaced between the bottom of the tube and the middle of the tube and said two driving wheels being in contact with the inner surface of the tube, and driving motors coupled to said driving wheels and driving said wheels for driving said car along said tube, wherein each said leg is extendable and retractable and each has an end part telescopically mounted on a main part, and said end and main parts define between them a hydraulic chamber, and a hydraulic control system coupled to the hydraulic chambers for extending said end parts of said legs, an improved means on said car for providing vertical stability, said stabilizing means comprising:

(a) one radiating spoke fixed to a central axle of the car extending toward the middle of the lower circumference of the tube, adjacent to and spaced from said tube, equipped with an even number of extendably mounted stabilizing wheels, transversely mounted to opposite sides of said spoke, two planar surfaces that contact the treads of said stabilizing wheels, between which said stabilizing wheels travel as the car moves through said tube;

(b) means for providing outward pressure to said stabilizing wheels to assure that they remain in contact with said planar surfaces as the car travels through the underground tube, said pressure means including a system of hydraulic cylinders to which each stabilizing wheel is extendably mounted and a regulated hydraulic pressure source to provide controlled hydraulic pressure to said hydraulic cylinders for pressing the stabilizing wheels outwardly against the planar surfaces; and an improved baffle-type braking system comprising:

(a) flat baffle plates;

(b) baffle plate control means for extending and retracting said baffle plates whereby said baffle plates may be pushed outward from the body of the car to provide wind resistance for the purpose of decelerating said car, said baffle plates control means including two hydraulic cylinders per baffle plate and a regulated source of hydraulic pressure;

(c) movable cover means, mounted flush with the outside of said car, for being selectively moved into place to cover said baffle plates when they are in the retracted position, so as to maintain the aerodynamics of said vehicle; and (d) a high pressure air ejection means including ports located on both the posterior and anterior sides of said baffle plates for exhausting high pressure air from said ports into the direction of travel of the vehicle during deceleration, thereby augmenting the braking force of said baffle plates, said air ejection means being supplied with a source of pressurized air to be selectively exhausted from said ports.

* * * * *